UNITED STATES PATENT OFFICE.

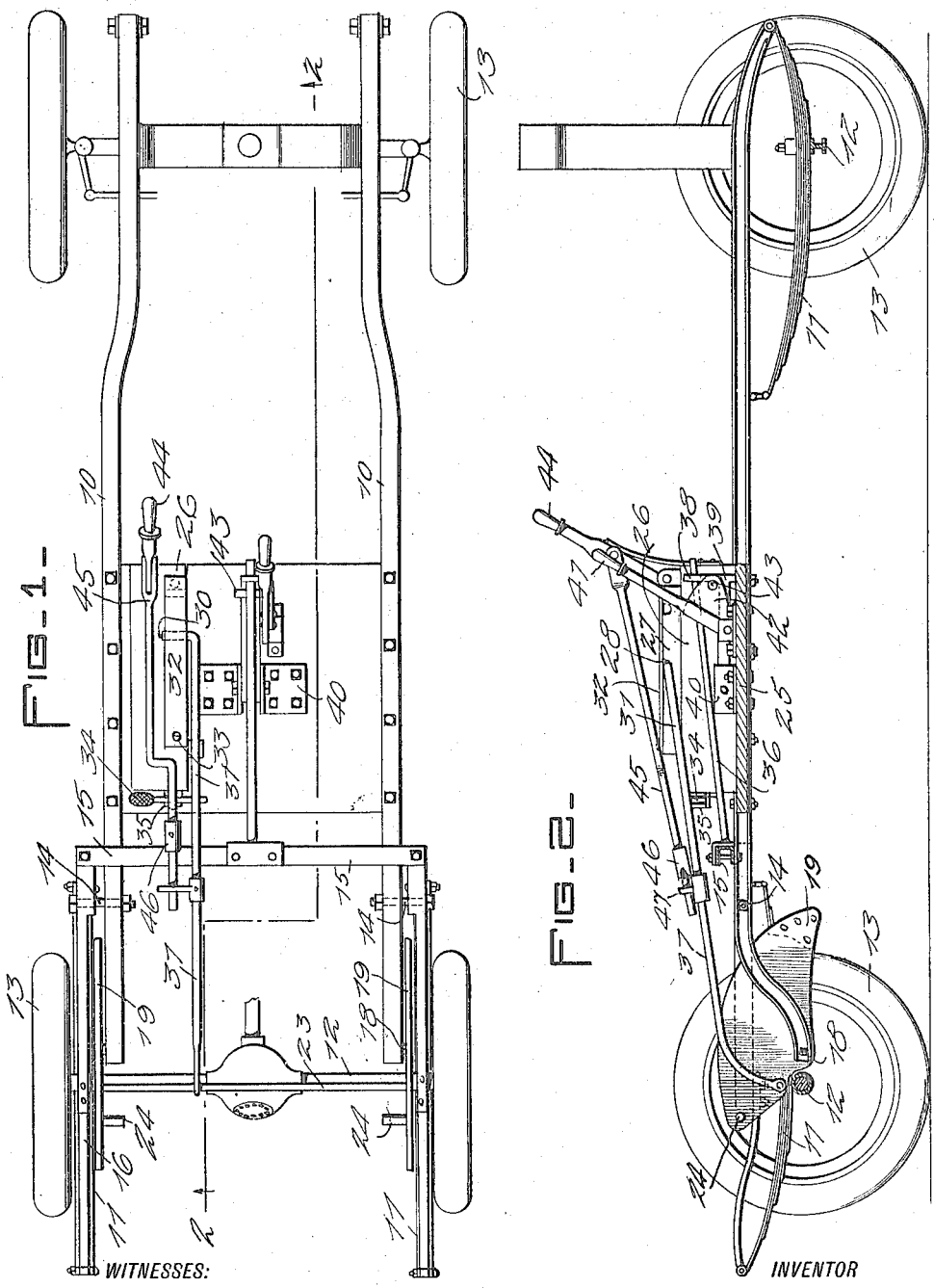

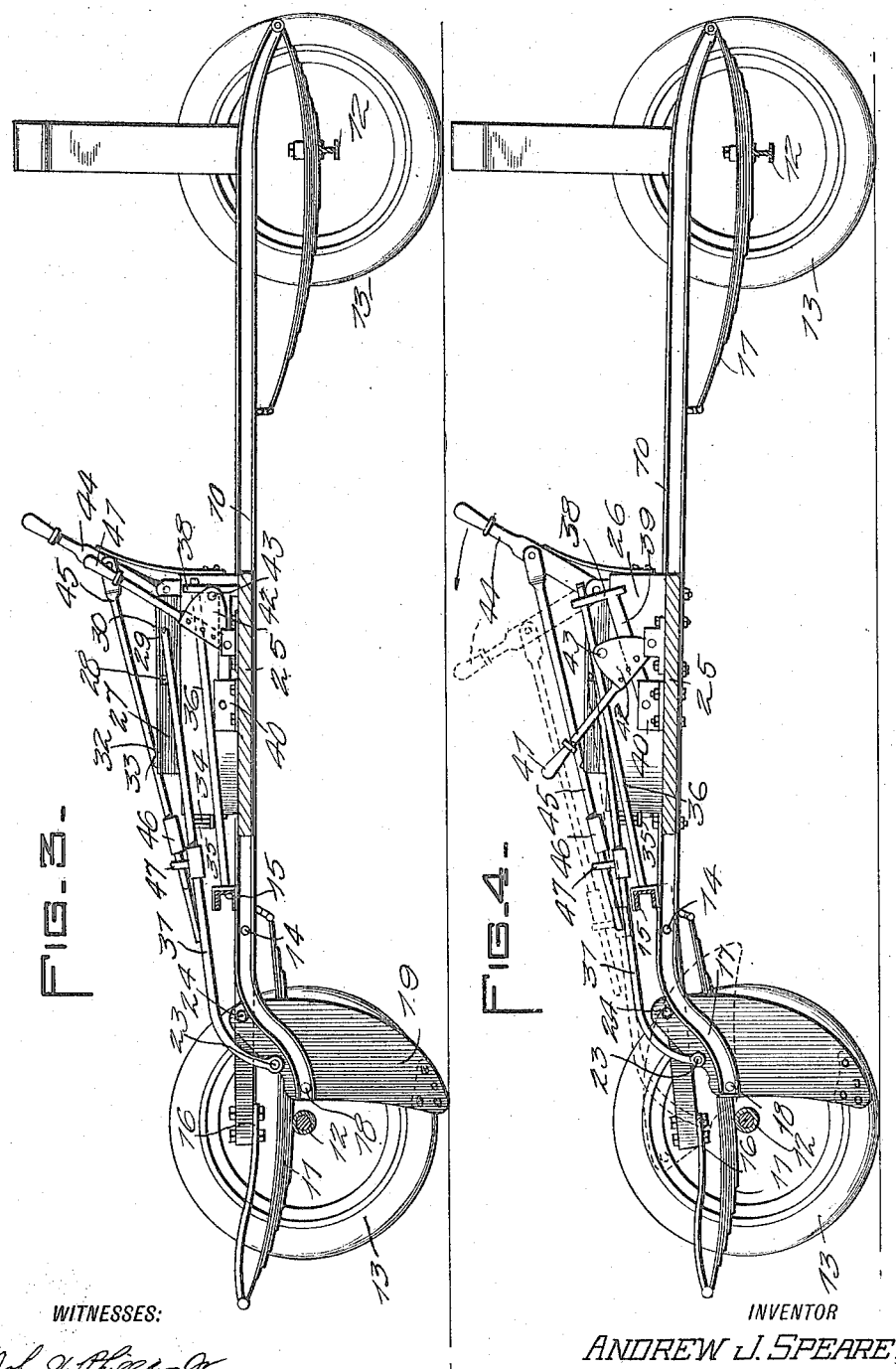

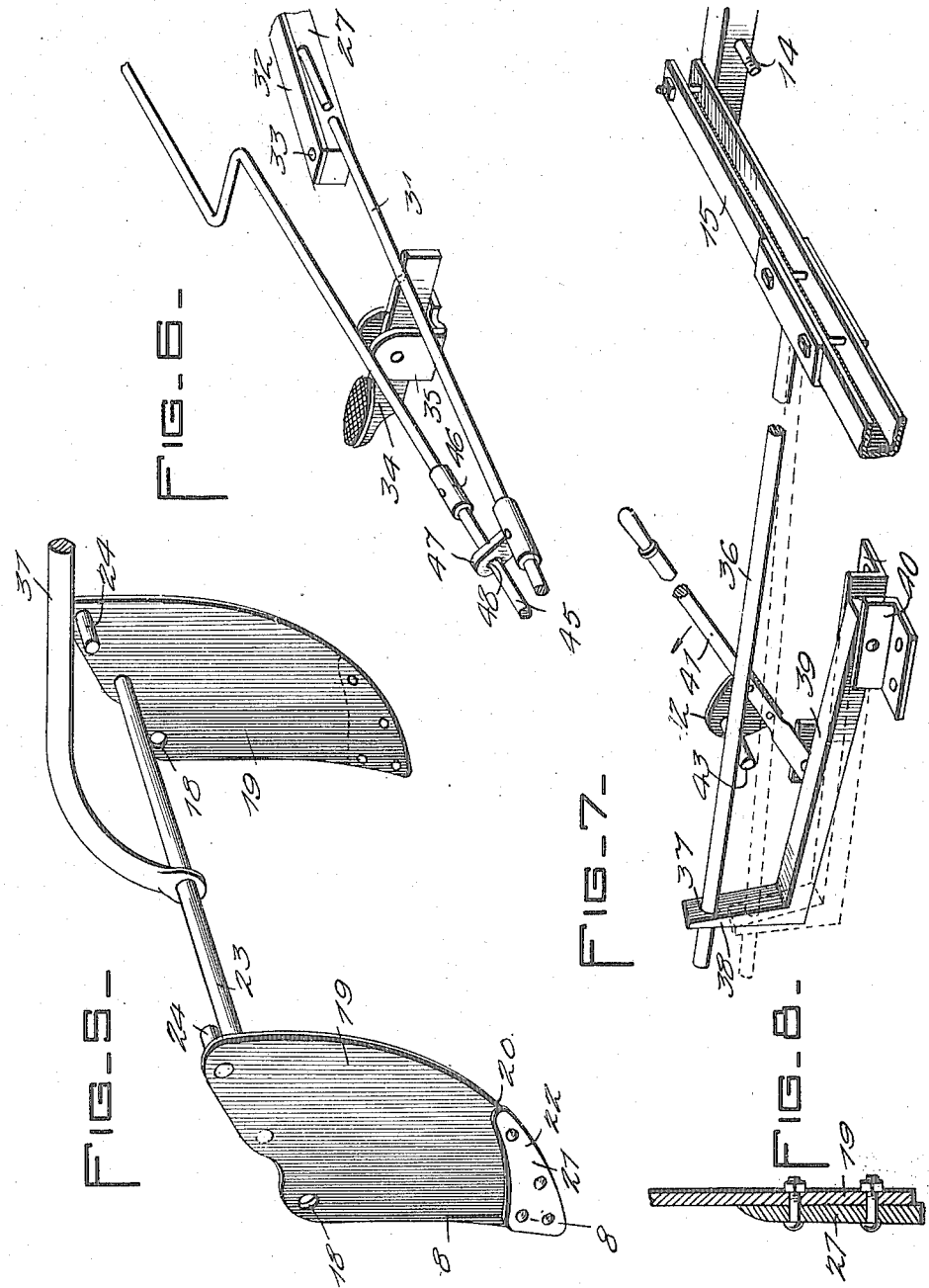

ANDREW JACKSON SPEARE, OF WESTPLAINS, MISSOURI.

BRAKE FOR AUTOMOBILES.

1,207,650.  Specification of Letters Patent.  Patented Dec. 5, 1916.

Application filed March 6, 1916. Serial No. 82,470.

*To all whom it may concern:*

Be it known that I, ANDREW J. SPEARE, a citizen of the United States, and a resident of Westplains, in the county of Howell and State of Missouri, have invented an Improvement in Brakes for Automobiles, of which the following is a specification.

This invention is an improvement in brakes and has particular reference to an automobile braking mechanism.

An object of the invention is the provision of ground engaging elements normally retained in raised position and quickly released to engage the ground and thereby raise certain of the wheels of a vehicle and render the same inoperative whereby the machine may, in an emergency, be quickly brought to a complete stop.

Another object is to provide means whereby the wheels, which have been raised from contact with the ground, may be lowered while the ground engaging elements are still in braking position, and to this end, the wheels and axle therefor are supported in a frame pivoted to the chassis of the vehicle and adjusted, by a lever operated mechanism, to lower an end of the frame and cause the wheels to engage the ground.

A further object includes the provision of lever operated means connected to the ground engaging or braking elements for adjusting the same to their normal or inoperative position whereby the wheels that have been raised are again lowered.

The inventive idea involved is capable of receiving a variety of mechanical expressions, one of which, for the purpose of illustrating the invention, is shown in the accompanying drawings, in which—

Figure 1 is a top plan view of the chassis of an automobile showing the invention applied thereto. Fig. 2 is a section on the line 2—2 of Fig. 1 with the braking elements in normal or inoperative position. Fig. 3 is a view similar to Fig. 2 showing the braking elements in their operative or braking position. Fig. 4 is a view similar to Fig. 3 with the braking elements well in operative position but with the rear wheels of the vehicle in contact with the ground. Fig. 5 is a detail perspective view of the braking or ground engaging elements constructed in accordance with the invention. Fig. 6 is a similar view of the mechanism for lowering and raising the braking elements into and out of contact with the ground. Fig. 7 is a similar view of the mechanism for lowering the rear wheels into contact with the ground while the braking elements are in operative position. Fig. 8 is a section on the line 8—8 of Fig. 5.

The invention, as illustrated in the drawings, is now believed to be in its preferred form and is used in connection with the chassis 10 of an automobile with which is associated the usual running gear including the springs 11, axles 12 secured thereto in the usual manner, and wheels 13.

Pivotally mounted, upon the bolts 14 adjacent the rear of the chassis, is a substantially U-shaped frame 15, the pivotal points of said frame being adjacent the main portion or cross piece thereof whereby sufficient leverage is secured to lower the rear wheels 13 into contact with the ground for a purpose which will appear in the course of the description, it being understood that the extremities of the side members of the frame 15 are secured to the rear springs 11 of the vehicle as indicated at 16.

The rear ends of the side members of the chassis 10 are preferably curved downwardly as indicated at 17 and have pivoted thereto at 18 the ground engaging braking elements 19. These braking elements are preferably constructed as best shown in Fig. 5 of the drawings and are each provided with a curved forward edge 20 and at their lower ends have secured thereto the reinforcing plates 21, the ground engaging edges 22 of which extend slightly beyond the edges 20 of the members 19. The pivotal point 18 is located in one of the upper corners of each member 19 and intermediate said upper corners said members are connected by means of a rod 23. The upper corner of each member 19 opposite to the pivotal point is provided with an inwardly extending stop 24 which engages the chassis 10, as shown in Figs. 3 and 4, for preventing further movement of and retaining the members in operative or braking position.

Intermediate the front and rear ends of the chassis the same has mounted thereon a suitable platform 25 to which is secured an elongated block 26. The means associated with this block 26 for locking the braking members 19 in adjusted positions consists of a bar 27 secured to the top of the block 26 and extending longitudinally thereof, said bar being provided with recesses 28 and 29 in the top face thereof. When the braking members 19 are in operative position the recess 28 receives the lateral extremity 30 of the locking rod 31 the other extremity of which is secured to the connecting rod 23 of said braking elements. A spring member 32 has one end secured to the bar 27 at 33 and engages the extremity 30 of the locking rod to retain the same in either of the notches 28 or 29 whereby the braking elements are maintained in their adjusted position until the locking rod 31 is actuated. Means are provided for actuating the locking rod 31 and consist of a foot operated treadle 34 mounted in the bracket 35 secured to the rear end of the block 26, said treadle extending transversely of the end of the block and having its upper edge engaging the bottom of said rod, as shown in Fig. 6. As previously described, when the braking elements 19 are in inoperative position the extremity 30 of the locking rod 31 is in engagement with the recess 28 and in order to adjust said braking elements to braking position, in engagement with the ground the foot treadle 34 is depressed whereupon the locking rod 31 will be thrust upwardly against the tension of the spring member 32 and thus release the extremity 30 from engagement with the recess 28 whereupon the braking elements 19 will, owing to their weight, fall to braking position, as illustrated in Fig. 3. The locking extremity 30 will then register with the recess 29 and the spring member 32 will cause the same to be engaged therein until the foot treadle 34 is again depressed to permit of a readjustment of the braking elements.

From the foregoing description it will be seen that the braking elements 19 may very quickly be adjusted to operative position thus providing an effective emergency brake, it being understood that when the lower ends of the braking elements engage the ground the entire rear portion of the chassis and the rear wheels will be elevated. It is desirable, at times, to permit the braking elements 19 to remain in operative position but out of contact with the ground so that the progress of the vehicle will be unimpaired and the braking elements be in such position that the same may be brought into contact with the ground with a quick adjustment of the frame 15. When the braking elements 19 are in the positions shown in Figs. 2 and 3 the frame 15 is in a substantially horizontal position and parallel with the side members of the chassis 10 but should it be desired to adjust the rear wheels 13 into contact with the ground while the braking elements are in inoperative position the frame 15 is tilted, in a manner to be presently described, to the position shown in Fig. 4, wherein the braking elements are in operative position but out of contact with the ground. In order to accomplish this adjustment, the frame 15 has extending forwardly therefrom an arm 36 the forward end of which extends through an opening 37 in the vertical end 38 of a pivoted member 39 mounted between the brackets 40 secured to the platform 25, as best shown in Fig. 7. When the frame 15 is in its normal position shown in Figs. 2 and 3, the arm 36 and member 39 are in the position shown in dotted lines in Fig. 7 and in order to adjust said frame 15 to the position shown in Fig. 4, a lever 41 is pivoted upon the platform 25 and has secured thereto a plate 42 having a laterally extending pin 43 which engages the under side of the arm 36 so that when the lever 41 is shifted to the position shown in Fig. 4 the arm 36 will be forced upwardly to the full line position shown in Fig. 7. In moving to the position shown in Fig. 4, as soon as the rear wheels 13 are in contact with the ground, the rearward movement of the lever 41 will cause the rear portion of the chassis to be slightly elevated thus carrying the braking elements to a similar position. It will thus be seen that when the parts are in the position illustrated in Fig. 4 that a forward shifting of the lever 41 will quickly cause the braking elements 19 to come in contact with the ground and thus bring the vehicle to a stop.

Means are provided for returning the braking elements to their normal position, as shown in Fig. 2, and include a lever 44 pivoted to the block 26 and connected intermediate its ends and one end of a rod 45 provided with a sleeve 46 adjacent its other end which is adapted to contact an abutment 47 extending laterally from the locking rod 31, said abutment having an opening 48 therein for the passage of said rod 45. By operating the foot treadle 34 to disengage the extremity 30 of the locking rod 31 from the recess 29 and then swinging the lever 44 to the dotted line position shown in Fig. 4, the sleeve 46 will be caused to contact the abutment 47 whereupon the rod 31 will also be moved rearwardly and cause the braking elements 31 to be swung about their pivots 18 to their raised or inoperative position at which time the extremity 30 of the locking rod 31 will again engage in the recess 28 and be retained therein by the spring member 32. It will be apparent that the invention may also be employed for the purpose of making repairs wherein it is necessary to elevate the axle of the vehicle in order to replace the tire or wheels and other like operations.

What is claimed is:

1. In a braking mechanism, the combination with the chassis of a vehicle, and a running gear therefor; adjustable braking elements associated with said chassis and normally retained out of contact with the ground, means for releasing said braking elements to permit the same to move to braking position whereby certain wheels of the running gear are raised, a frame pivoted in said chassis and connected to a portion of said running gear, and means for tilting said frame about its pivot whereby the raised wheels of the running gear are lowered into contact with the ground and the braking elements elevated while in braking position.

2. In a braking mechanism, the combination with the chassis of a vehicle, and a running gear therefor; adjustable braking elements associated with said chassis and normally retained out of contact with the ground, means for releasing said braking elements to permit the same to move to braking position whereby certain wheels of the running gear are raised, a frame pivoted in said chassis and connected to a portion of said running gear, means for tilting said frame about its pivot whereby the raised wheels of the running gear are lowered into contact with the ground and the braking elements elevated while in braking position, and means for adjusting said braking elements to normal position.

3. In a braking mechanism, the combination with the chassis of a vehicle, and a running gear therefor; adjustable braking elements associated with said chassis and normally retained out of contact with the ground, means for releasing said braking elements to permit the same to move to braking position whereby certain wheels of the runnng gear are raised, a frame pivoted in said chassis and connected to a portion of said running gear, and means for tilting said frame to initially lower said raised wheels into contact with the ground and then upon further movement of the frame raise a portion of said chassis to elevate the braking elements, while in braking position, in contact with the ground.

4. In a braking mechanism, the combination with the chassis of a vehicle, and a running gear therefor; of adjustable braking elements normally out of contact with the ground, means for permitting the adjustment of said braking elements into contact with the ground whereby certain wheels of the running gear are raised, and means for lowering said wheels into contact with the ground while the braking elements are in braking position.

5. In a braking mechanism, the combination with the chassis of a vehicle, and a running gear therefor; of adjustable braking elements normally out of contact with the ground, means for permitting the adjustment of said braking elements into contact with the ground whereby certain wheels of the running gear are raised, and means for lowering said wheels into contact with the ground and at the same time raising the braking elements while the latter are in braking position.

6. In a braking mechanism, the combination with the chassis of a vehicle, and the running gear therefor; of ground engaging braking elements pivoted to said chassis and normally out of contact with the ground, means for lowering said braking elements into contact with the ground, a pivoted frame mounted in said chassis, and secured to the springs of the running gear, and means for adjusting said frame to lower certain wheels of the running gear into contact with the ground when the braking elements are in braking position.

7. In a braking mechanism, the combination with the chassis of a vehicle, and the running gear therefor; of ground engaging braking elements pivoted to said chassis and normally out of contact with the ground, means for lowering said braking elements into contact with the ground, a pivoted frame mounted in said chassis and secured to the springs of the running gear, and means for adjusting said frame to lower certain wheels of the running gear into contact with the ground and at the same time raise said braking elements when the latter are in operative position.

8. In a braking mechanism, the combination with the chassis of a vehicle, of ground engaging braking elements pivoted to said chassis and normally out of contact with the ground, releasable means for locking said braking elements in normal and braking positions, means for releasing the last-named means to permit of the adjustment of said braking elements, and means engageable with said releasable means and adjustable relative thereto to return said braking elements to normal position after being released.

9. In a braking mechanism, the combination with the chassis of a vehicle, of ground engaging braking elements normally out of contact with the ground, a locking member connected to said braking elements, a member mounted on the chassis of the vehicle and having recesses therein for receiving said locking member when the braking elements are in operative or inoperative position, means for releasably retaining said locking member in engagement with said recesses, and means for disengaging said locking member from said recesses to permit of the raising or lowering of said braking elements.

10. In a braking mechanism, the combination with the chassis of a vehicle, and the running gear therefor; of adjustable braking elements normally out of contact with the ground, means for adjusting said braking elements into contact with the ground and raising certain of the wheels of the running gear, a frame pivoted to the chassis and connected to certain springs of the running gear, a rod extending from said frame, and a lever pivoted to the chassis and having an extension for engaging said rod whereby to adjust said frame to cause said wheels to be lowered into contact with the ground and simultaneously raise said braking elements out of contact with the ground.

11. In a braking mechanism, the combination with the chassis of a vehicle, and the running gear therefor; of adjustable braking elements normally out of contact with the ground, means for adjusting said braking elements into contact with the ground and raising certain of the wheels of the running gear, a frame pivoted to the chassis and connected to certain springs of the running gear, a rod extending from said frame, a lever pivoted to the chassis and having an extension for engaging said rod whereby to adjust said frame to cause said wheels to be lowered into contact with the ground and simultaneously raise said braking elements out of contact with the ground, and means for adjusting said braking elements to their normal position.

12. In a braking mechanism, the combination with the chassis of a vehicle, and the running gear therefor; of adjustable braking elements normally out of contact with the ground, means for adjusting said braking elements into contact with the ground and raising certain of the wheels of the running gear, a frame pivoted to the chassis and connected to certain springs of the running gear, a rod extending from said frame, a lever pivoted to the chassis and having an extension for engaging said rod whereby to adjust said frame to cause said wheels to be lowered into contact with the ground and simultaneously raise said braking elements out of contact with the ground, and means connected to the first-named means and adjustable relative thereto and then movable therewith to raise said braking elements to their normal position.

13. In a braking mechanism, the combination with the chassis of a vehicle, and a running gear therefor; braking elements associated with said chassis and normally retained out of contact with the ground, means for releasing said braking elements to permit the same to move to braking position whereby certain wheels of the running gear are raised, an adjustable member connecting said chassis with a portion of said running gear, and means for adjusting said member whereby the raised wheels of the running gear are lowered into contact with the ground and the braking elements elevated while in braking position.

ANDREW JACKSON SPEARE.

Copies of this patent may be obtained for five cents each, by addressing the "Commissioner of Patents, Washington, D. C."